(12) United States Patent  
Blanchard et al.

(10) Patent No.: US 12,527,761 B2  
(45) Date of Patent: Jan. 20, 2026

(54) MIXED TRIGLYCERIDES

(71) Applicant: SOCIÉTÉ DES PRODUITS NESTLÉ S.A., Vevey (CH)

(72) Inventors: Carine Blanchard, Le Mont-sur-Lausanne (CH); Bernard Cuenoud, Cully (CH); Frederic Destaillats, Servion (CH); Elizabeth Forbes-Blom, Epalinges (CH); Heiko Oertling, Lausanne (CH); Amaury Patin, Lausanne (CH)

(73) Assignee: Societe des Produits Nestle S.A., Vevey (CH)

(*) Notice: Subject to any disclaimer, the term of this patent is extended or adjusted under 35 U.S.C. 154(b) by 1152 days.

(21) Appl. No.: 17/414,382

(22) PCT Filed: Dec. 17, 2019

(86) PCT No.: PCT/EP2019/085525  
§ 371 (c)(1),  
(2) Date: Jun. 16, 2021

(87) PCT Pub. No.: WO2020/127182  
PCT Pub. Date: Jun. 25, 2020

(65) Prior Publication Data  
US 2022/0071942 A1 Mar. 10, 2022

(30) Foreign Application Priority Data  
Dec. 18, 2018 (EP) .................................. 18213346

(51) Int. Cl.  
*A61K 31/225* (2006.01)  
*C11C 3/10* (2006.01)

(52) U.S. Cl.  
CPC .............. *A61K 31/225* (2013.01); *C11C 3/10* (2013.01)

(58) Field of Classification Search  
CPC .................................................. A61K 31/225  
See application file for complete search history.

(56) References Cited

U.S. PATENT DOCUMENTS 2,892,721 A 6/1959 Nelson  
3,870,733 A * 3/1975 Kubota ............... C11C 3/10  
                                                  426/35  
5,434,278 A 7/1995 Pelloso et al.  
(Continued)

FOREIGN PATENT DOCUMENTS

CN 102396608 A 4/2012  
CN 108368525 A 8/2018  
GB 2126082 3/1984  
(Continued)

OTHER PUBLICATIONS

Williams et al (Lancet Neurol 2018; 17: 84-93) (Year: 2018).*  
Ollilainen et.al (Lipids (2009) 44:169-195) (Year: 2009).*  
Antongiovanni et al. "Monobutyrine: a novel feed additive in the diet of broiler chickens" Italian Journal of Animal Science, 2010, vol. 9, No. 4, 4 pages.  
(Continued)

*Primary Examiner* — John S Kenyon  
*Assistant Examiner* — Rehana Ismail  
(74) *Attorney, Agent, or Firm* — K&L Gates LLP

(57) ABSTRACT

A composition comprising a compound having the formula (1), (2), (3), (4) or combinations thereof, wherein n1, n2, n3, n4, n5 and n6 are independently 4 to 10.

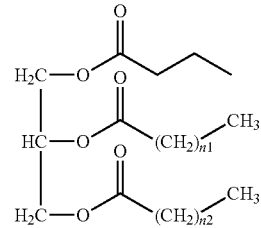

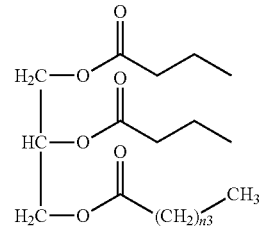

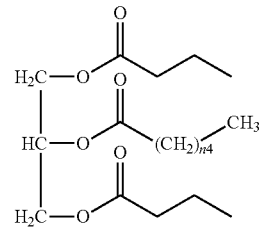

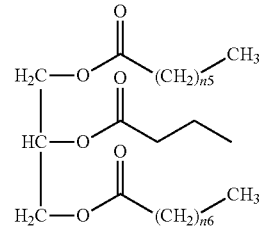

16 Claims, 3 Drawing Sheets

(56) References Cited

U.S. PATENT DOCUMENTS

2009/0123634 A1 5/2009 Klemann et al.
2011/0077300 A1 3/2011 Ye et al.

FOREIGN PATENT DOCUMENTS

| JP | H08507566 A | 8/1996 |
| JP | 2009524587 A | 7/2009 |
| JP | 7516376 B2 | 7/2024 |
| WO | 2006085346 A1 | 8/2006 |
| WO | 2014153416 A1 | 9/2014 |
| WO | 2018052356 | 3/2018 |
| WO | 2019022149 A1 | 1/2019 |

OTHER PUBLICATIONS

Kemppinen et al. "Quantification of triacylglycerols in butterfat by gas chromatography-electron impact mass spectrometry using molar correction factors for [M-RCOO]+ ions" Journal of Chromatography A, 2006, vol. 1134, pp. 260-283.

Chinese Office Action for Appl No. 201980083345.9 dated Jul. 30, 2023.

St-Pierre et al., "Butyrate is more Ketogenic than Leucine or Octanoate-monoacylglycerol in Healthy Adult Humans", Journal of Functional Foods, vol. 32, 2017, pp. 170-175.

Chinese Office Action for Chinese Appl No. 201980083345.9 dated Mar. 6, 2024.

Mandøe et al., "Comparing Olive Oil and C4-dietary Oil, a Prodrug for the Gpr119 Agonist, 2-oleoyl Glycerol, Less Energy Intake of the Latter is Needed to Stimulate Incretin Hormone Secretion in Overweight Subjects With Type 2 Diabetes", Nutrition and Diabetes, 2018, vol. 8, Issue No. 2, pp. 1-10.

Japanese Office Action for Appl No. 2021-531757 dated Jun. 18, 2024, 4 pages.

Japanese Office Action for Appl No. 2024-107634 dated Aug. 21, 2025, 4 pages.

\* cited by examiner

MIXED TRIGLYCERIDES

CROSS REFERENCE TO RELATED APPLICATIONS

The present application is a National Stage of International Application No. PCT/EP2019/085525, filed on Dec. 17, 2019, which claims priority to European Patent Application No. 18213346.2, filed on Dec. 18, 2018, the entire contents of which are being incorporated herein by reference.

FIELD OF THE INVENTION

The present invention relates to a dietary source of butyric acid containing triglycerides having improved organoleptic properties. The present invention also provides butyric acid containing triglycerides that provide a rich source of ketones.

BACKGROUND TO THE INVENTION

Salts and esters of butyric acid are known as butyrates or butanoates. Butyric acid in ester form is found in many foods such as milk, especially goat, sheep, cow, camel and buffalo milk, and milk-derived products such as butter as well as cheeses such as parmesan cheese. Butyric acid is also a product of anaerobic fermentation, for example, as a product of fermentation produced by gut microbiota. Tributyrin is a triglyceride made of three ester functional groups with three butyrate moieties and the glycerol backbone. Under hydrolysis conditions such as those occurring during digestion, tributyrin is potentially a source of three moles of butyric acid per mole of tributyrin.

The multiple beneficial effects of butyrate are well documented in mammals and livestock. At the intestinal level, butyrate plays a regulatory role on the transepithelial fluid transport, ameliorates mucosal inflammation and oxidative status, reinforces intestinal barrier function, and influences visceral sensitivity and intestinal motility.

Butyrate has been shown to improve the intestinal structure of piglets with short-bowel syndrome (Bartholome et al., J of Parenter Enteral Nutr. 2004; 28 (4): 210-222) and decrease the proliferation of colon cancer cells in human cell lines (Lupton, J Nutr., 2004; 134 (2): 479-482). The production of volatile fatty acids such as butyric acid from fermentable fibers may contribute to the role of dietary fiber in colon cancer (Lupton, J Nutr., 2004; 134 (2): 479-482). Short-chain fatty acids, which include but are not restricted to acetic, propionic and butyric acid, are produced by colonic bacteria that feed on, or ferment non-digestible fiber and/or prebiotics. Butyric acid also benefits the colonocytes by increasing energy production. Butyrate has additionally been shown to decrease the incidence of diarrhea (Berni Canani et al., Gastroenterol., 2004; 127 (2): 630-634), improve inflammatory bowel disease (Scarpellini et al., Dig Liver Dis., 2007; 1 (1): 19-22) and small intestine health (Kotunia et al., J Physiol Pharmacol. 1994; 55 (2): 59-68).

Butyrate is also known to stimulate the production of high amounts of ketones when ingested. (Saint-Pierre et al., 2016; 32 Journal of Functional Foods 32:170-175). Ketones are an alternative source of energy (beside carbohydrate, protein and fat) that can reach periphery organs effectively, such as the brain. Ketones can produce Acetyl-CoA directly in mitochondria, supporting the production of ATP, and can be used instead of glucose by neural tissue (Tetrick et al, 2010, Comparative Medicine 60:486-490). Ketones may also exert a protective effect on neurons from free radical damage (Vanltallie T B et al, 2003, Ketones: metabolism's ugly duckling. Nutr. Rev. 61:327-41).

Studies have suggested that ketones administration following ischaemic injury reduces the impact on the brain of the ischaemic injury. Indeed, ketone supplements have been considered as a therapeutic option in traumatic brain injury (White and Venkatesh, 2011, Critical Care 15:219). Furthermore, studies suggest that neurodegenerative diseases, such as Parkinson's disease and Alzheimer's disease, will benefit from ketone administration. By way of example, Reger et al, (2004, Neurobiol Aging. 25:311-4. 14) found that elevation of serum ketones levels in Alzheimer's patients improves the cognitive scores.

Butyric acid and tributyrin are both food additives that are generally regarded as safe (GRAS) (21CFR582.60 and 21CFR184.1903 respectively), and are natural components of many dairy items. However, butyric acid is associated with negative sensory qualities such as vomit-like, fecal, and cheesy aroma attributes. Tributyrin also has negative sensory qualities, in particular high bitterness. These unpleasant taste and odor attributes can make the oral administration of compositions including these compounds particularly difficult, especially in the pediatric population.

Medium Chain Triglycerides (MCT) and medium chain fatty acids (MCFAs) are also a source of ketones. Octanoic acid (C8) is the most efficient MCFA at making blood ketones in humans (Vanderberghe et al.; 2017 Curr. Dev. Nutr. 1 (4)). However, undesirable effects of gastro-intestinal intolerance, such as diarrhoea and stomach cramps, have been associated with high dose intake (>10 g), which limits the amount that can be ingested at once, and hence limits the amount of blood ketones produced.

It would be beneficial to provide a food-grade source of butyrate having improved organoleptic properties as compared to available products.

SUMMARY OF THE INVENTION

The present invention provides compounds that are a source of butyrate having improved organoleptic properties and potential for high ketone production after oral or enteral intake in human and other mammals. In particular, the invention provides new triglycerides (TG) composed of a mixture of butyrate and medium chain fatty acids (MCFAs). The compounds have improved odour and/or taste relative to butyric acid, butyrate salts and/or tributyrin. The compounds may be used as a dietary source of butyric acid. The compounds may be used in, for example, nutritional compositions and dietary supplements, and as a source of ketones. The compounds may also provide simultaneously an increase of butyrate and ketones blood levels.

Fatty acids are liberated from triglycerides due to lipases, naturally present in the gastrointestinal tract. Relative to butyrate salts, the compounds do not add additional mineral salts to the final formulation.

According to a first aspect of the present invention, there is provided a composition comprising a compound having the formula (1)

[Structure of formula (1): glycerol backbone with H₂C—O—C(=O)—CH₂CH₂CH₃ (butyrate) at sn-1, HC—O—C(=O)—(CH₂)n1—CH₃ at sn-2, and H₂C—O—C(=O)—(CH₂)n2—CH₃ at sn-3]

(2)

[Structure of formula (2): glycerol backbone with H₂C—O—C(=O)—CH₂CH₂CH₃ at sn-1, HC—O—C(=O)—CH₂CH₂CH₃ at sn-2, and H₂C—O—C(=O)—(CH₂)n3—CH₃ at sn-3]

(3) or

[Structure of formula (3): glycerol backbone with H₂C—O—C(=O)—CH₂CH₂CH₃ at sn-1, HC—O—C(=O)—(CH₂)n4—CH₃ at sn-2, and H₂C—O—C(=O)—CH₂CH₂CH₃ at sn-3]

(4)

[Structure of formula (4): glycerol backbone with H₂C—O—C(=O)—(CH₂)n5—CH₃ at sn-1, HC—O—C(=O)—CH₂CH₂CH₃ at sn-2, and H₂C—O—C(=O)—(CH₂)n6—CH₃ at sn-3]

or combinations thereof, wherein n1, n2, n3, n4, n5 and n6 are independently 4 to 10.

In one embodiment n1=n2 and/or n5=n6. In a further embodiment n1=n2=n3=n4=n5=n6.

The composition may comprise the compound having formula (1) and the compound having formula (2).

The composition may comprise the compound having formula (1) and the compound having formula (3).

The composition may comprise the compound having formula (1) and the compound having formula (4).

The composition may comprise the compound having formula (2) and the compound having formula (3).

The composition may comprise the compound having formula (2) and the compound having formula (4).

The composition may comprise the compound having formula (3) and the compound having formula (4).

The composition may comprise the compound having formula (1) the compound having formula (2), and the compound having formula (3).

The composition may comprise the compound having formula (1) the compound having formula (2), and the compound having formula (4).

The composition may comprise the compound having formula (1) the compound having formula (3), and the compound having formula (4).

The composition may comprise the compound having formula (2) the compound having formula (3), and the compound having formula (4).

The composition may comprise the compound having formula (1), the compound having formula (2), the compound having formula (3) and the compound having formula (4).

In one embodiment, the compound having formula (1) comprises at least 2%, 5%, 10% or 15% by weight of the total triglycerides of the composition. In one embodiment, the compound having formula (1) comprises 2 to 35%, 5 to 30% or 10 to 25% by weight of the total triglycerides of the composition.

In one embodiment, the compound having formula (2) comprises at least 2%, 5%, 10% or 15% by weight of the total triglycerides of the composition. In one embodiment, the compound having formula (2) comprises 2 to 35%, 5 to 30% or 10 to 25% by weight of the total triglycerides of the composition.

In one embodiment, the compound having formula (3) comprises at least 2%, 5%, 10% or 15% by weight of the total triglycerides of the composition. In one embodiment, the compound having formula (3) comprises 2 to 35%, 5 to 30% or 10 to 25% by weight of the total triglycerides of the composition.

In one embodiment, the compound having formula (4) comprises at least 2%, 5%, 10% or 15% by weight of the total triglycerides of the composition. In one embodiment, the compound having formula (4) comprises 2 to 35%, 5 to 30% or 10 to 25% by weight of the total triglycerides of the composition.

The compounds having formula (1), (2), (3) and (4) may comprise at least 50%, 60%, 70%, 80%, 90%, 95% or 99% by weight of the total triglycerides of the composition.

In one embodiment, the compound having formula (1) comprises at least 2%, 5%, 10% or 15% by weight of the total butyrate moiety containing triglycerides in the composition, and/or the compound having formula (2) comprises at least 2%, 5%, 10% or 15% by weight of the total butyrate moiety containing triglycerides in the composition, and/or the compound having formula (3) comprises at least 2%, 5%, 10% or 15% by weight of the total butyrate moiety containing triglycerides in the composition, and/or the compound having formula (4) comprises at least 2%, 5%, 10% or 15% by weight of the total butyrate moiety containing triglycerides in the composition.

The compounds having formula (1), (2), (3) and (4) may comprise at least 50%, 60%, 70%, 80%, 90%, 95% or 99% by weight of the total butyrate moiety containing triglycerides of the composition and/or comprise at least 50%, 60%, 70%, 80%, 90%, 95% or 99% by weight of the total medium chain fatty acid moiety containing triglycerides in the composition.

According to one embodiment of the present invention, there is provided a composition comprising a compound having the formula (5)

[Structure of formula (5): glycerol backbone with H₂C—O—C(=O)—CH₂CH₂CH₃ (butyrate) at sn-1, HC—O—C(=O)—(CH₂)₆—CH₃ at sn-2, and H₂C—O—C(=O)—(CH₂)₆—CH₃ at sn-3]

or combinations thereof.

The composition may comprise the compound having formula (5) and the compound having formula (6).

The composition may comprise the compound having formula (5) and the compound having formula (7).

The composition may comprise the compound having formula (5) and the compound having formula (8).

The composition may comprise the compound having formula (6) and the compound having formula (7).

The composition may comprise the compound having formula (6) and the compound having formula (8).

The composition may comprise the compound having formula (7) and the compound having formula (8).

The composition may comprise the compound having formula (5), the compound having formula (6) and the compound having formula (7).

The composition may comprise the compound having formula (5), the compound having formula (6) and the compound having formula (8).

The composition may comprise the compound having formula (5), the compound having formula (7) and the compound having formula (8).

The composition may comprise the compound having formula (6), the compound having formula (7) and the compound having formula (8).

The composition may comprise the compound having formula (5), the compound having formula (6), the compound having formula (7) and the compound having formula (8).

In one embodiment, the compound having formula (5) comprises at least 2%, 5%, 10%, 15%, 20% or 25% by weight of the total triglycerides of the composition. In one embodiment, the compound having formula (5) comprises 5 to 35%, 10 to 30%, or 20 to 30% by weight of the total triglycerides of the composition In one embodiment, the compound having formula (6) comprises at least 2%, 5%, 10%, 15%, 20% or 25% by weight of the total triglycerides of the composition. In one embodiment, the compound having formula (6) comprises 5 to 35%, 10 to 30%, or 15 to 25% by weight of the total triglycerides of the composition.

In one embodiment, the compound having formula (7) comprises at least 2%, 5%, 10%, 15%, 20% or 25% by weight of the total triglycerides of the composition. In one embodiment, the compound having formula (7) comprises 5 to 35%, 10 to 30%, or 10 to 20% by weight of the total triglycerides of the composition.

In one embodiment, the compound having formula (8) comprises at least at least 2%, 5%, 10%, 15%, 20% or 25% by weight of the total triglycerides of the composition. In one embodiment, the compound having formula (8) comprises 5 to 35%, 5 to 20%, or 5 to 15% by weight of the total triglycerides of the composition.

In one embodiment, the compound having formula (5) comprises at least 5% by weight of the total triglycerides of the composition, the compound having formula (6) comprises at least 5% by weight of the total triglycerides of the composition, the compound having formula (7) comprises at least 5% by weight of the total triglycerides of the composition, and the compound having formula (8) comprises at least 5% by weight of the total triglycerides of the composition.

In one embodiment, the compound having formula (5) comprises at least 25% by weight of the total triglycerides of the composition, the compound having formula (6) comprises at least 15% by weight of the total triglycerides of the composition, the compound having formula (7) comprises at least 10% by weight of the total triglycerides of the composition, and the compound having formula (8) comprises at least 5% by weight of the total triglycerides of the composition.

In one embodiment, the compound having formula (5) comprises 20 to 30% by weight of the total triglycerides of the composition, the compound having formula (6) comprises 15 to 25% by weight of the total triglycerides of the composition, the compound having formula (7) comprises 10 to 20% by weight of the total triglycerides of the composition, and the compound having formula (8) comprises 5 to 15% by weight of the total triglycerides of the composition.

The compounds having formula (5), (6), (7) and (8) may comprise at least 50%, 60%, 70%, 80%, 90%, 95% or 99% by weight of the total triglycerides of the composition.

In one embodiment, the compound having formula (5) comprises at least 5% by weight of the total butyrate moiety containing triglycerides in the composition. In one embodiment, the compound having formula (5) comprises at least 10%, 20% or 30% by weight of the total butyrate moiety containing triglycerides in the composition.

In one embodiment, the compound having formula (6) comprises at least 5% by weight of the total butyrate moiety containing triglycerides in the composition. In one embodiment, the compound having formula (6) comprises at least 10%, 15% or 20% by weight of the total butyrate moiety containing triglycerides in the composition.

In one embodiment, the compound having formula (7) comprises at least 5%, 10% or 15% by weight of the total butyrate moiety containing triglycerides in the composition.

In one embodiment, the compound having formula (8) comprises at least 5% or 10% by weight of the total butyrate moiety containing triglycerides in the composition.

The compounds having formula (5), (6), (7) and (8) may comprise at least 50%, 60%, 70%, 80%, 90%, 95% or 99% by weight of the total butyrate moiety containing triglycerides in the composition, and/or comprise at least 50%, 60%, 70%, 80%, 90%, 95% or 99% by weight of the total octanoate moiety containing triglycerides in the composition.

In a preferred embodiment, tributyrin comprises less than 10% by weight of the total triglycerides in the composition, preferably less than 8% by weight, more preferable less than 5% by weight of the total triglycerides in the composition.

The composition of the invention may be a nutritional composition.

The composition may be a dietary supplement. The dietary supplement may be in the form of a capsule, tablet, sachet, powder or liquid shot.

According to another aspect, there is provided a composition of the invention for providing a source of butyrate with improved organoleptic properties.

According to another aspect, there is provided a composition of the invention for use in improving or maintaining gastrointestinal health.

According to another aspect, there is provided a composition of the invention for use in increasing ketone levels, preferably blood ketone levels.

According to another aspect, there is provided a composition of the invention for treating a disease treatable by ketone levels, preferably blood ketone levels.

According to another aspect, there is provided a composition of the invention for treating a disease associated with low ketone levels, preferably low blood ketone levels. In one embodiment there is provided a composition of the invention for use in the treatment or prevention of neurological disease, metabolic disease, cancer and/or cardiac ischemia.

In one embodiment, there is provided a composition of the invention for use in the treatment or prevention of one or more diseases selected from the list consisting of: a brain energy deficiency condition, a migraine, memory disorder, age-related memory disorder, brain injury, stroke, amyloid lateral sclerosis, multiple sclerosis, cognitive impairment, cognitive impairment post-intensive care, age-induced cognition impairment, Alzheimer's disease, Parkinson's disease, Huntingdon's disease, inherited metabolic disorders (such as glucose transporter type 1 deficiency syndrome and pyruvate dehydrogenase complex deficiency), depression, schizophrenia, epilepsy, narcolepsy, diabetes, obesity, non-alcoholic fatty liver disease and polycystic ovary syndrome.

In one embodiment there is provided a composition of the invention for use in the treatment or prevention of epilepsy.

According to another aspect, there is provided a compound having formula (1). In one embodiment n1=n2=6. In this embodiment a compound having the formula (1) corresponds to a compound having the formula (5).

According to another aspect, there is provided a compound having formula (2). In one embodiment n3=6. In this embodiment a compound having the formula (2) corresponds to a compound having the formula (6).

According to another aspect, there is provided a compound having formula (3). In one embodiment n4=6. In this embodiment a compound having the formula (3) corresponds to a compound having the formula (7).

According to another aspect, there is provided a compound having formula (4). In one embodiment n5=n6=6. In this embodiment a compound having the formula (4) corresponds to a compound having the formula (8).

According to another aspect, there is provided use of a compound having the formula (1), (2), (3) and/or (4) as defined herein, preferably a compound having the formula (5), (6), (7) and/or (8), for providing a source of butyrate with improved organoleptic properties.

According to another aspect, there is provided a compound having the formula (1), (2), (3) or (4) or a combination thereof, preferably a compound having the formula (5), (6), (7) or (8) or a combination thereof, for use in increasing blood ketone levels, preferably blood ketone levels.

According to another aspect, there is provided a compound having the formula (1), (2), (3) or (4) or a combination thereof, preferably a compound having the formula (5), (6), (7) or (8) or a combination thereof, for use in improving or maintaining gastrointestinal (GI) health and/or for increasing blood ketone levels.

According to another aspect, there is provided a compound having the formula (1), (2), (3) or (4) or a combination thereof, preferably a compound having the formula (5), (6), (7) or (8) or a combination thereof, for use as a medicament.

According to another aspect, there is provided a compound having the formula (1), (2), (3) or (4) or a combination thereof, preferably a compound having the formula (5), (6), (7) or (8) or a combination thereof, for treating a disease treatable by increasing blood ketone levels.

According to another aspect, there is provided a composition of the invention for treating a disease associated with low ketone levels, preferably low blood ketone levels. In one embodiment, there is provided a compound having the formula (1), (2), (3) or (4) or a combination thereof, preferably a compound having the formula (5), (6), (7) or (8) or a combination thereof, for use in the prevention or treatment of neurological disease, metabolic disease, cancer and/or cardiac ischemia.

In one embodiment, there is provided a compound having the formula (1), (2), (3) and/or (4), preferably a compound having the formula (5), (6), (7) and/or (8), for use in the treatment or prevention of one or more diseases selected from the list consisting of: a brain energy deficiency condition, migraine, memory disorder, age-related memory disorder, brain injury, stroke, amyloid lateral sclerosis, multiple sclerosis, cognitive impairment, cognitive impairment post-intensive care, age-induced cognition impairment, Alzheimer's disease, Parkinson's disease, Huntingdon's disease, inherited metabolic disorders (such as glucose transporter type 1 deficiency syndrome and pyruvate dehydrogenase complex deficiency), depression, schizophrenia, epilepsy, narcolepsy, diabetes, obesity, non-alcoholic fatty liver disease and polycystic ovary syndrome.

In one embodiment, there is provided a compound having the formula (1), (2), (3) or (4) or a combination thereof, preferably a compound having the formula (5), (6), (7) or (8) or a combination thereof, for the treatment of epilepsy.

According to another aspect, there is provided a method of increasing ketone levels, preferably blood ketone levels, comprising administering a compound or composition defined herein to a subject in need thereof.

According to another aspect, there is provided a method of treating a disease treatable by increasing ketone levels, preferably blood ketone levels, comprising administering a compound or composition defined herein to a subject in need thereof.

According to another aspect, there is provided a method of treating or preventing a disease associated with low ketone levels, preferably low blood ketone levels, comprising administering a compound or composition defined herein to a subject in need thereof.

According to another aspect, there is provided a method of treating or preventing a neurological disease, metabolic disease, cancer and/or cardiac ischemia comprising administering a compound or composition defined herein to a subject in need thereof.

In one embodiment there is provided a method of treating or preventing one or more diseases selected from the list consisting of: a brain energy deficiency condition, a migraine, memory disorder, age-related memory disorder, brain injury, stroke, amyloid lateral sclerosis, multiple sclerosis, cognitive impairment, cognitive impairment post-intensive care, age-induced cognition impairment, Alzheimer's disease, Parkinson's disease, Huntingdon's disease, inherited metabolic disorders (such as glucose transporter type 1 deficiency syndrome and pyruvate dehydrogenase complex deficiency), depression, schizophrenia, epilepsy, narcolepsy, diabetes, obesity, non-alcoholic fatty liver disease and polycystic ovary syndrome, comprising administering a compound or composition defined herein to a subject in need thereof.

According to another aspect, there is provided a method for producing a composition of the invention, or a compound having the formula (1), (2), (3) or (4) as defined herein, comprising interesterification of tributyrin and one or more triglycerides selected from the list consisting of: trihexanoin, triheptanoin, tricaprylin, trinonanoin, tricaprin, triundecanoin and tridodecanoin.

According to one embodiment, there is provided a method for producing a composition of the invention, or a compound having the formula (5), (6), (7) or (8) as defined herein, comprising interesterification of tributyrin and tricaprylin.

DETAILED DESCRIPTION OF THE INVENTION

Triglycerides

A triglyceride (also known as a triacylglycerol) is a triester that is derived from glycerol and three fatty acids.

Fatty acids may be either unsaturated or saturated. Fatty acids which are not attached to other molecules are referred to as free fatty acids (FFA).

The term "fatty acid moiety" refers to the part of the triglyceride that originates from a fatty acid in an esterification reaction with glycerol. The triglycerides used in the present invention comprise at least one butyric acid (C4) moiety and at least one medium chain fatty acid moiety (C6, C7, C8, C9, C10, C11 or C12).

A medium chain fatty acid moiety may contain between 6 and 12 carbon atoms. Accordingly, a medium chain fatty acid moiety may be hexanoate (caproic acid), heptanoate (enanthic acid), octanoate (caprylic acid), nonanoate (pelargonic acid), decanoate (capric acid), undecanoate (undecylic acid) or dodecanoate (lauric acid).

When one or more medium chain fatty acid moiety is present in a triglyceride, the medium chain fatty acid moieties may contain the same or a different number of carbon atoms.

In some embodiments, the one or more medium chain fatty acid moieties contain between 6 and 10 carbon atoms. In a preferred embodiment, the one or more medium chain fatty acid moieties contain 8 carbon atoms (the medium chain fatty acid moieties are octanoate).

The triglycerides of the present invention may be synthesised by, for example, esterification of the medium chain FFAs (e.g. hexanoic acid, heptanoic acid, octanoic acid, nonanoic acid, decanoic acid, undecanoic acid, and/or dodecanoic acid) and the butyric acid with glycerol. When the medium chain fatty acid moiety is octanoate, the triglyceride may be synthesised by, for example, esterification of octanoic acid and butyric acid with glycerol.

Alternatively, the triglycerides of the present invention may be synthesised by, for example, interesterification between tributyrin and trihexanoin, triheptanoin, tricaprylin, trinonanoin, tricaprin, triundecanoin and/or tridodecanoin. When the medium chain fatty acid moiety is octanoate, the triglyceride may be synthesised by, for example, interesterification between tributyrin and tricaprylin (trioctanoin).

By way of example, a method of obtaining compounds having the formula (5), (6), (7) and (8) is shown below:

(6)

(7)

(8)

A single butyrate moiety containing triglyceride may be used herein. Alternatively, a mixture of different butyrate moiety containing triglycerides may be used.

Compositions

The present invention provides compositions comprising butyrate moiety containing triglycerides referred to herein. The composition may be, for example, a nutritional composition or a dietary supplement.

The expression "nutritional composition" means a composition that nourishes a subject.

In some specific embodiments, the nutritional composition according to the invention is an "enteral nutritional composition" that is to say a foodstuff that involves the gastrointestinal tract for its administration. The gastric introduction may involve the use of a naso-gastric or oro-gastric tube leading directly to the stomach. This may be used especially in hospitals or clinics.

A "dietary supplement" may be used to complement the nutrition of an individual (it is typically used as such but it might also be added to any kind of compositions intended to be ingested). It may be in the form of tablets, capsules, pastilles or a liquid for example. The supplement may further contain protective hydrocolloids (such as gums, proteins, modified starches), binders, film forming agents, encapsulating agents/materials, wall/shell materials, matrix compounds, coatings, emulsifiers, surface active agents, solubilizing agents (oils, fats, waxes, lecithins etc.), adsorbents, carriers, fillers, co-compounds, dispersing agents, wetting agents, processing aids (solvents), flowing agents, taste masking agents, weighting agents, jellifying agents and gel forming agents. The dietary supplement may also contain conventional pharmaceutical additives and adjuvants, excipients and diluents, including, but not limited to, water, gelatine of any origin, vegetable gums, lignin-sulfonate, talc, sugars, starch, gum arabic, vegetable oils, polyalkylene glycols, flavouring agents, preservatives, stabilizers, emulsifying agents, buffers, lubricants, colorants, wetting agents, fillers, and the like. When the composition is a supplement, it can be provided in the form of unit doses.

The nutritional composition of the invention may contain a protein source, a carbohydrate source and/or a lipid source. In some embodiments however, especially if the nutritional composition of the invention is a supplement or a fortifier, there may be only lipids (or a lipid source).

Protein sources based on, for example, whey, casein and mixtures thereof may be used as well as protein sources based on soy. As far as whey proteins are concerned, the protein source may be based on acid whey or sweet whey or mixtures thereof and may include alpha-lactalbumin and beta-lactoglobulin in any desired proportions.

The proteins may be either fully or partially hydrolysed. If hydrolysed proteins are required, the hydrolysis process may be carried out as desired and as is known in the art. For example, whey protein hydrolysates may be prepared by enzymatically hydrolysing the whey fraction in one or more steps.

In one embodiment the proteins of the composition are plant based protein.

The nutritional composition according to the present invention may contain a carbohydrate source. Any carbohydrate source such as lactose, sucrose, saccharose, maltodextrin, starch and mixtures thereof may be used. The nutritional composition of the invention may also contain vitamins and minerals understood to be essential in the daily diet and in nutritionally significant amounts. Minimum requirements have been established for certain vitamins and minerals. Examples of minerals, vitamins and other nutrients optionally present in the composition of the invention include vitamin A, vitamin B1, vitamin B2, vitamin B3, vitamin B6, vitamin B12, vitamin E, vitamin K, vitamin C, vitamin D, folic acid, inositol, niacin, biotin, pantothenic acid, choline, calcium, phosphorous, iodine, iron, magnesium, copper, zinc, manganese, chlorine, potassium, sodium, selenium, chromium, molybdenum, taurine, and L-carnitine. Minerals are usually added in salt form. The presence and amounts of specific minerals and other vitamins will vary depending on the intended population. If necessary, the nutritional composition of the invention may contain emulsifiers and stabilisers such as soy, lecithin, citric acid esters of mono- and diglycerides, and the like. The nutritional composition of the invention may also contain other substances which may have a beneficial effect such as lactoferrin, osteopontin, TGFbeta, sIgA, glutamine, nucleotides, nucleosides, and the like.

The composition of the invention can further comprise at least one non-digestible oligosaccharide (e.g. prebiotics).

Prebiotics are usually non-digestible in the sense that they are not broken down and absorbed in the stomach or small intestine and thus remain intact when they pass into the colon where they are selectively fermented by the beneficial bacteria. Examples of prebiotics include certain oligosaccharides, such as fructooligosaccharides (FOS), inulin, xylooligosaccharides (XOS), polydextrose or any mixture thereof. In a particular embodiment, the prebiotics may be fructooligosaccharides and/or inulin. In a specific embodiment, the prebiotics is a combination of FOS with inulin such as in the product sold by BENEO-Orafti under the trademark Orafti® oligofructose (previously Raftilose®) or in the product sold by BENEO-Orafti under the trademark Orafti® inulin (previously Raftiline®). Another example is a combination of 70% short chain fructooligosaccharides and 30% inulin, which is registered by Nestle under the trademark "Prebio 1". The nutritional composition of the invention can also comprise at least one milk's oligosaccharide that can be a BMO (bovine milk oligosaccharide) and/or a HMO (human milk oligosaccharide). The composition of the present invention can further comprise at least one probiotic (or probiotic strain), such as a probiotic bacterial strain.

The probiotic microorganisms most commonly used are principally bacteria and yeasts of the following genera: *Lactobacillus* spp., *Streptococcus* spp., *Enterococcus* spp., *Bifidobacterium* spp., *Clostridium* spp., and *Saccharomyces* spp.

In some particular embodiments, the probiotic is a probiotic bacterial strain. In some specific embodiments, it is Bifidobacteria and/or Lactobacilli.

In some particular embodiments, the microorganisms are derived from fecal matter. The composition of the present invention can be in, for example, a solid (e.g. powder), liquid or gelatinous form.

The composition of the present invention can be in, for example, tablet, dragee, capsule, gel cap, powder, granule, solution, emulsion, suspension, coated particle, spray-dried particle, a pill or in the form of a shot e.g., a small serving of liquid that may be consumed quickly, for example in one or more mouthfuls.

The composition may in the form of a pharmaceutical composition and may comprise one or more suitable pharmaceutically acceptable carriers, diluents and/or excipients.

Examples of such suitable excipients for compositions described herein may be found in the "Handbook of Pharmaceutical Excipients", 2nd Edition, (1994), Edited by A Wade and PJ Weller.

Acceptable carriers or diluents for therapeutic use are well known in the pharmaceutical art, and are described, for example, in Remington's Pharmaceutical Sciences, Mack Publishing Co. (A. R. Gennaro edit. 1985).

The pharmaceutical compositions may comprise as, or in addition to, the carrier, excipient or diluent any suitable binder(s), lubricant(s), suspending agent(s), coating agent(s) and/or solubilising agent(s). Examples of suitable binders include starch, gelatin, natural sugars such as glucose, anhydrous lactose, free-flow lactose, beta-lactose, corn sweeteners, natural and synthetic gums, such as acacia, tragacanth or sodium alginate, carboxymethyl cellulose and polyethylene glycol.

Examples of suitable lubricants include sodium oleate, sodium stearate, magnesium stearate, sodium benzoate, sodium acetate, sodium chloride and the like.

Preservatives, stabilisers, dyes and even flavouring agents may be provided in the composition. Examples of preservatives include sodium benzoate, sorbic acid and esters of p-hydroxybenzoic acid. Antioxidants and suspending agents may be also used.

Treatment

It is to be appreciated that all references herein to treatment include curative, palliative and prophylactic treatment. Treatment may also include arresting progression in the severity of a disease.

Both human and veterinary treatments are within the scope of the invention.

Gastrointestinal (GI) Health

The compounds and compositions defined herein are a source of butyrate/butyric acid and may therefore be used for improving or maintaining gastrointestinal (GI) health.

The multiple beneficial effects on GI health of butyrate are well documented. At the intestinal level, butyrate plays a regulatory role on the transepithelial fluid transport, ameliorates mucosal inflammation and oxidative status, reinforces the epithelial defense barrier, and modulates visceral sensitivity and intestinal motility.

Fatty acids, including butyric acid, are a chief source of energy for cells of the colonic mucosa (Reodriger, Gut. 1980; 21:793-798), and of the greatest importance to colonocytes in the distal region of the colon. The strong trophic effect of butyric acid on the mucous membrane of the small intestine has been observed in experimental animals (Guilloteau et al., 2 J Anim Feed Sci. 2004; 13, Suppl. 1:393-396). A decrease in the intestinal butyric acid concentration leads to the atrophy of colonic mucosa, which is usually explained by a decrease in the availability of substrates to colonocytes. On the other hand, administration of butyrate into the colon lumen induces weight gain, an increase in DNA synthesis and the depth of intestinal crypts (Kripke et al., J Parenter Enter Nutr. 1989; 13:109-116).

A high concentration of butyric acid achieved through the fermentation of insoluble dietary fiber or following the anal administration of butyrate may inhibit early and late stages of colon oncogenesis through the regulation of transcription, expression and activation of key proteins of the apoptotic cascade (Aviv-Green et al., J Nutr . . . 2002; 132 (7): 1812-18).

Chapman et al. (Gut 1994; 35 (1): 73-76) showed that inflamed colonic mucosa captures much more butyrate than glutamine or glucose. Experiments have shown that butyrate perfusion causes a significant reduction of inflammation, and a decrease in the extent of ulceration of the colon wall in the rat (Andoh et al., J Parenter Enter Nutr. 1999; 23 (5): 70-73).

The effectiveness of butyrate enemas has been shown by clinical observations in patients with ulcerative colitis (Han et al., Gastroenterol Clin North Am. 1999; 28:423-443; Scheppach et al., Gastroenterol Suppl. 1997; 222:53-57).

The direct anti-inflammatory activity of butyrate may be connected with the inhibition of the migration of the KappaB nuclear factor (NFKB) and its binding of DNA, and by the same token the inhibition of transcription and production of pro-inflammatory cytokines (Segain et al., Gut. 2000; 47:397-403).

In one embodiment, the compounds and compositions defined herein may be used for treating inflammatory bowel disease, for example, Chron's disease or Ulcerative Colitis.

Ketones

As discussed above, the compounds and compositions of the invention, which comprise C4 and medium chain fatty acids, are a rich source of ketones.

In the body, ketones are mainly produced by the liver from fatty acids via ketogenesis. In ketogenesis, medium chain fatty acids are enzymatically broken down via β-oxidation to form acetyl-CoA and "ketone bodies" (water-soluble molecules that contain a ketone group). Octanoate is the most efficient medium chain fatty acid at making ketone bodies via C4 ketogenesis. The three primary ketone bodies are acetoacetate, β-hydroxybutyrate and acetone. Thus in some embodiments, the compounds and compositions of the invention are a source of acetoacetate, β-hydroxybutyrate and/or acetone.

Ketogenesis can occur in response to an unavailability of blood glucose, for instance during fasting, starving, low carbohydrate diets, prolonged exercise and untreated type 1 diabetes mellitus. In particular, ketogenesis is promoted by a low carbohydrate diet, or a "ketogenic diet". In one embodiment, the composition according to the present invention is for use as part of a low carbohydrate or ketogenic diet.

In addition to providing a source of fatty acids for ketogenesis, butyrate may also stimulate fatty acid oxidation and ketone production (Cavaleri, F. and Bashar, E., 2018. Journal of Nutrition and Metabolism).

In one embodiment, the compound or composition according to the present invention is for use in providing ketones to a bodily fluid of a subject.

In one embodiment, the compound or composition according to the present invention is for use in increasing blood ketone levels, and/or treating a disease treatable by increasing blood ketone levels.

Ketone bodies are transported from the liver to other tissues, in particular the brain. Ketones can be transported to the brain by, for example, monocarboxylic transporter 1 (MCT1) where they are mainly metabolised by neurones. Ketone bodies are able to provide a source of energy by reconversion to acetyl-CoA. The brain gets a portion of its fuel requirements from ketone bodies when glucose is less available than normal. The heart can also effectively use ketone bodies.

Free fatty acids and ketones produced from triglycerides described herein can provide an alternative energy source to glucose to supplement or replace the energy in cells such as myocytes, cardiomyocytes, or neuronal cells. Thus, in metabolic conditions, such as cancer, trauma and ischemia, ketone bodies may be beneficial by providing an additional energy source to tissue at risk of cell death (Barañano, K. W. and Hartman, A. L., 2008. Current treatment options in neurology, 10 (6), p. 410.). For instance, a ketogenic diet (one way of promoting production of ketone bodies) is a therapy for drug-resistant epilepsy and may have therapeutic effects for a range of neurological disorders (Gano, L., Patel, M. and Rho, J. M., 2014. Journal of lipid research, pp.jlr-R048975).

Brain tissue consumes a large amount of energy in proportion to its volume. In an average healthy subject, the brain gets most of its energy from oxygen-dependent metabolism of glucose. Typically, the majority of the brain's energy is used to help neurons or nerve cells send signals and the remaining energy is used for cell-health maintenance. A deficiency in brain energy, for example caused by impairment of glucose utilisation, can result in neuronal hyperactivity, seizures and cognitive impairments.

Accordingly, the compounds and compositions of the invention may be used to treat deficiency in neurological conditions or diseases. The compounds and compositions of the invention may be used to treat deficiency in brain energy and/or conditions associated with said deficiency.

Examples of brain energy deficiency conditions or diseases include: migraine, memory disorder, age-related memory disorder, brain injury, neurorehabilitation, stroke and post-stroke, amyloid lateral sclerosis, multiple sclerosis, cognitive impairment, cognitive impairment post-intensive care, age-induced cognition impairment, Alzheimer's disease, Parkinson's disease, Huntingdon's disease, inherited metabolic disorders (such as glucose transporter type 1 deficiency syndrome and pyruvate dehydrogenase complex deficiency), bipolar disorder, schizophrenia, and/or epilepsy.

A "neurological condition" refers to a disorder of the nervous system. Neurological conditions may result from damage to the brain, spinal column or nerves, caused by illness or injury. Examples of the symptoms of a neurological condition include paralysis, muscle weakness, poor coordination, loss of sensation, seizures, confusion, pain and altered levels of consciousness. An assessment of the response to touch, pressure, vibration, limb position, heat, cold, and pain as well as reflexes can be carried out to determine whether the nervous system is impaired in a subject.

In one embodiment, the neurological condition is the result of traumatic damage to the brain.

The terms "cognitive impairment" and "cognition impairment" refer to disorders that give rise to impaired cognition, in particular disorders that primarily affect learning, memory, perception, and/or problem solving. Cognitive impairment may occur in a subject after intensive care. Cognitive impairment may occur as part of the ageing process.

The term "cognition" refers to the set of all mental abilities and processes, including knowledge, attention, memory and working memory, judgment and evaluation, reasoning and "computation", problem solving and decision making, comprehension and production of language.

Levels of and improvements in cognition can be readily assessed by the skilled person using any suitable neurological and cognitive tests that are known in the art, including cognitive tests designed to assess speed of information processing, executive function and memory. Suitable example tests include Mini Mental State Examination (MMSE), Cambridge Neuropsychological Test Automated Battery (CANTAB), Alzheimer's Disease Assessment Scale-cognitive test (ADAScog), Wisconsin Card Sorting Test, Verbal and Figural Fluency Test and Trail Making Test, Wechsler Memory scale (WMS), immediate and delayed Visual Reproduction Test (Trahan et al. Neuropsychology, 1988 19 (3) p. 173-89), the Rey Auditory Verbal Learning Test (RAVLT) (Ivnik, R J. et al. Psychological Assessment: A Journal of Consulting and Clinical Psychology, 1990 (2): p. 304-312), electroencephalography (EEG), magnetoencephalography (MEG), Positron Emission Tomography (PET), Single Photon Emission Computed Tomography (SPECT), Magnetic Resonance Imaging (MRI), functional Magnetic Resonance Imaging (fMRI), computerised tomography and long-term potentiation.

A ketogenic diet may also have therapeutic effects for metabolic diseases such as glucose transporter type 1 (GLUT-1) deficiency, pyruvate dehydrogenase (PDH) deficiency, phosphofructokinase (PFK) deficiency; and glycogen storage disease including McArdle's disease, in addition to cancer (astrocytomas, prostate and gastric) and cardiac ischemia (Barañano, K. W. and Hartman, A. L., 2008. Current treatment options in neurology, 10 (6), p. 410.). A ketogenic diet has also been shown to be an effective strategy for management of type two diabetes (Azar, S. T., Beydoun, H. M. and Albadri, M. R., 2016. J Obes Eat Disord, 2 (2)).

Accordingly, compounds and compositions of the invention may be used to treat glucose transporter type 1 (GLUT-1) deficiency, pyruvate dehydrogenase (PDH) deficiency, phosphofructokinase (PFK) deficiency; and glycogen storage disease including McArdle's disease and diabetes. The compounds and compositions of the invention may also be used to treat cancer and cardiac ischemia.

Administration

Preferably, the compounds and compositions described herein are administered enterally.

Enteral administration may be oral, gastric, and/or rectal.

In general terms, administration of the combination or composition described herein may, for example, be by an oral route or another route into the gastro-intestinal tract, for example the administration may be by tube feeding.

In a preferred embodiment, administration is oral.

The subject may be a mammal such as a human, canine, feline, equine, caprine, bovine, ovine, porcine, *cervine* and primates. Preferably, the subject is a human.

Further preferred features and embodiments of the present invention will now be described by way of non-limiting examples.

EXAMPLES

The practice of the present invention will employ, unless otherwise indicated, conventional techniques of chemistry, molecular biology, microbiology, recombinant DNA and immunology, which are within the capabilities of a person of ordinary skill in the art. Such techniques are explained in the literature. See, for example, J. Sambrook, E. F. Fritsch, and T. Maniatis, 1989, Molecular Cloning: A Laboratory Manual, Second Edition, Books 1-3, Cold Spring Harbor Laboratory Press; Ausubel, F. M. et al. (1995 and periodic supplements; Current Protocols in Molecular Biology, ch. 9, 13, and 16, John Wiley & Sons, New York, N.Y.); B. Roe, J. Crabtree, and A. Kahn, 1996, DNA Isolation and Sequencing: Essential Techniques, John Wiley & Sons; J. M. Polak and James O'D. McGee, 1990, In Situ Hybridization: Principles and Practice; Oxford University Press; M. J. Gait (Editor), 1984, Oligonucleotide Synthesis: A Practical Approach, Irl Press; D. M. J. Lilley and J. E. Dahlberg, 1992, Methods of Enzymology: DNA Structure Part A: Synthesis and Physical Analysis of DNA Methods in Enzymology, Academic Press; and E. M. Shevach and W. Strober, 1992 and periodic supplements, Current Protocols in Immunology, John Wiley & Sons, New York, NY. Each of these general texts is herein incorporated by reference.

Example 1—Preparation of Butyrated Triglycerides (TAG)

Compositions comprising butyrated TAG were generated by chemical interesterification between tributyrin and tricaprylin in the presence of sodium methoxide catalyst.

The following steps were used:

Reaction.
  The tricaprylin (Neobee 895 from Stepan) and the tributyrin were added successively to a multipurpose reactor L2600 at room temperature. 1 litre of tricaprylin was set aside to promote the addition of sodium methoxide.
  Degassing was performed under agitation with nitrogen.
  The reactor was heated to 60° C.
  Sodium methoxide suspended in 1 litre of tricaprylin was added (whip agitation before adding).
  The mixture was heated to 80° C. under inert atmosphere (nitrogen) for 3 h (time counted from 60° C.

Work-Up.
  The mixture was cooled below 60° C. . . .
  The mixture was washed in deionized water (approximately 8 L) until a neutral pH (elimination of sodium methoxide) was obtained.
  After the first wash, the reactor was emptied and washed in hot water if pieces of sodium methoxide were glued to the walls.
  After the last wash and removal of the aqueous layer, the crude resulting oil was dried under vacuum (60 mBar at 60° C. until there was no water left).

Refining
  Addition of 3% of Tonsil Supreme 110 FF in suspension.
  Agitation and heating at 70° C. under vacuum (60 mbar) for 40 min.
  Nitrogen Compensation.
  Filtration of bleaching lands on büchner (Filtrox 8-20 microns).
  16.48 kg crude.

Deodorizing
  8 kg discolored product was added to a 6 L L800 deodorizer.
  Heating at 142° C. under 0.8 mbar with steam injection (V water/h=30 mL/h) for 3 h (145° C. to 1 mbar, 149° C. to 1.2 mbar, 154° C. to 1.5 mbar).
  Sampling at 1 h, 2 h and at the end of Deodorization.
  Cooling to 60° C. (1 h15).
  Nitrogen Compensation.
  Filtration.
  6.07 kg obtained.

The constituents of the triglycerides are shown below in Table 1. These triglycerides are represented by the three fatty acids they contain. These fatty acids are represented by their lipid number: 4:0 for butyrate; 8:0 for caprylic acid.

The fatty acid in the middle is located on the position sn-2 in the triglyceride. As an example, 8:0-4:0-8:0 is a triglyceride having both a butyrate in position sn-2 and octanoate in position sn-1 and position sn-3.

TAG profile and regioisomers were analysed by liquid chromatography coupled to high resolution mass spectrometer. Lipid classes' proportion was evaluated by liquid chromatography coupled to evaporative light scattering detector (ELSD).

The C4C8 triglyceride composition had good organoleptic properties (neutral taste, no odour).

TABLE 1

| TAG regioisomer profile [g/100 g] | | |
| --- | --- | --- |
| TAG | C4/C8 crude g/100 g TAG | C4/C8 after deodorization g/100 g TAG |
| 8:0-8:0-4:0 | 26.5 | 26.6 |
| 4:0-4:0-8:0 | 18.51 | 18.6 |
| 8:0-8:0-8:0 | 16.04 | 20.1 |
| 4:0-8:0-4:0 | 14.25 | 13.2 |
| 4:0-4:0-4:0 | 10.98 | 4.4 |
| 8:0-4:0-8:0 | 8.89 | 11.8 |
| 4:0-10:0-8:0 | 0.78 | 1 |
| 4:0-8:0-10:0 | 0.54 | 0.6 |
| 8:0-4:0-10:0 | 0.52 | 0.6 |
| 4:0-4:0-10:0 | 0.49 | 0.5 |
| 8:0-8:0-10:0 | 0.41 | 0.5 |
| 4:0-10:0-4:0 | | 0.4 |
| Sum | 97.9 | 98.4 |

| FA | Total FA | FA | Total FA |
| --- | --- | --- | --- |
| 8:0 | 53.9 | 8:0 | 59.6 |
| 4:0 | 34.3 | 4:0 | 28.7 |
| 10:0 | 1.3 | 10:0 | 1.5 |
| 18:1 | 0.3 | 18:1 | 0.3 |
| 6:0 | 0.1 | 6:0 | 0.1 |
| 3:0 | 0.1 | 16:0 | 0.1 |
| 2:0 | 0.1 | 3:0 | 0.1 |
| 16:0 | 0.0 | 2:0 | 0.1 |

Example 2—Administration (In-Vivo) of Butyrated Triglycerides (TAG)

After an overnight fast, at time 0, 15 healthy volunteers orally consumed 15 g of C4C8 butyrated triglycerides of Example 1 "MCT C4/C8", emulsified in 70 mL of a 5% aqueous milk protein solution and 15 healthy volunteers orally consumed 15 g of medium chain triglycerides, with a mixture of C8:C10 ratio of about 58:42 "MCT", emulsified in 70 mL of a 5% aqueous milk protein solution. At time 30 min, a standard breakfast was provided and consumed over 15 min. Blood samples were taken at regular interval over 4 h via a venous catheter and plasma was analyzed for C3, C4, C8, 3-hydroxybutyric acid (BHB) and aceto-acetate (AcAc) by UPLC-MSMS.

Figure 1:
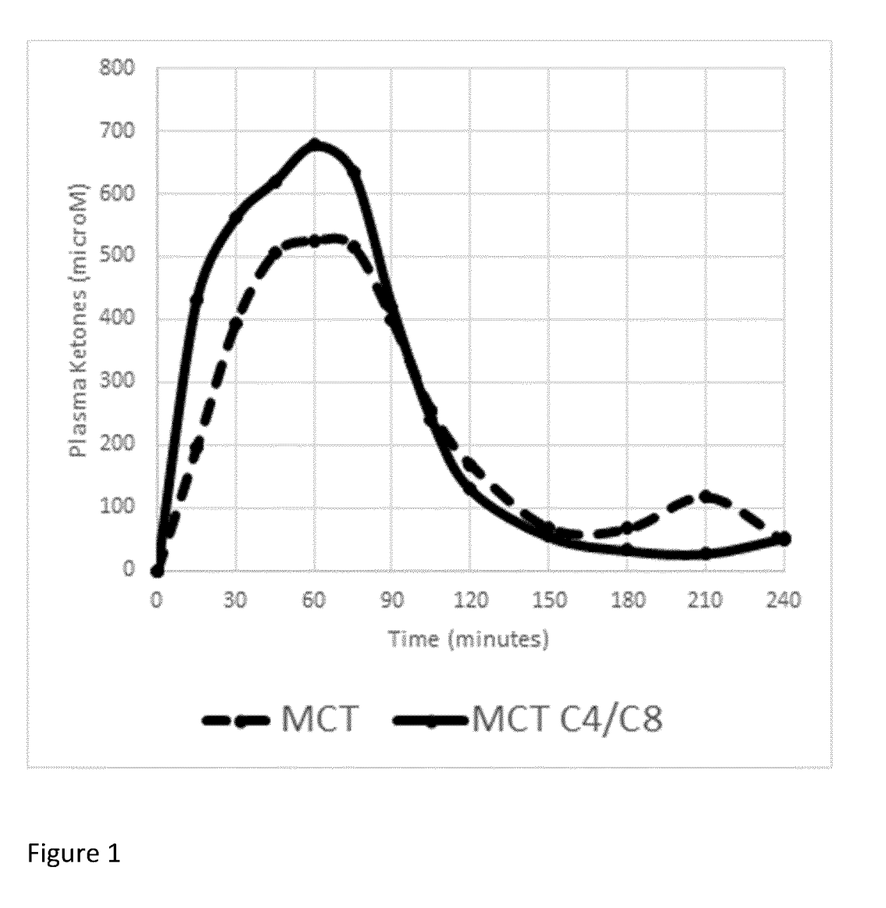
FIG. 1 shows mean average total blood plasma ketone (BHB and AcAc) levels over 4 hrs, after consumption of C4C8 butyrated triglycerides according to the invention "MCT C4/C8" or MCT.

Mean average total plasma ketone (BHB and AcAc) levels in the 15 patients of each treatment group, C4C8 butyrated triglycerides "MCT C4/C8" and MCT groups, over the 4 hours are shown in FIG. 1. As can be seen from FIG. 1 higher Cmax of plasma ketones was observed for the C4C8 butyrated triglycerides treatment group.

Figure 2:
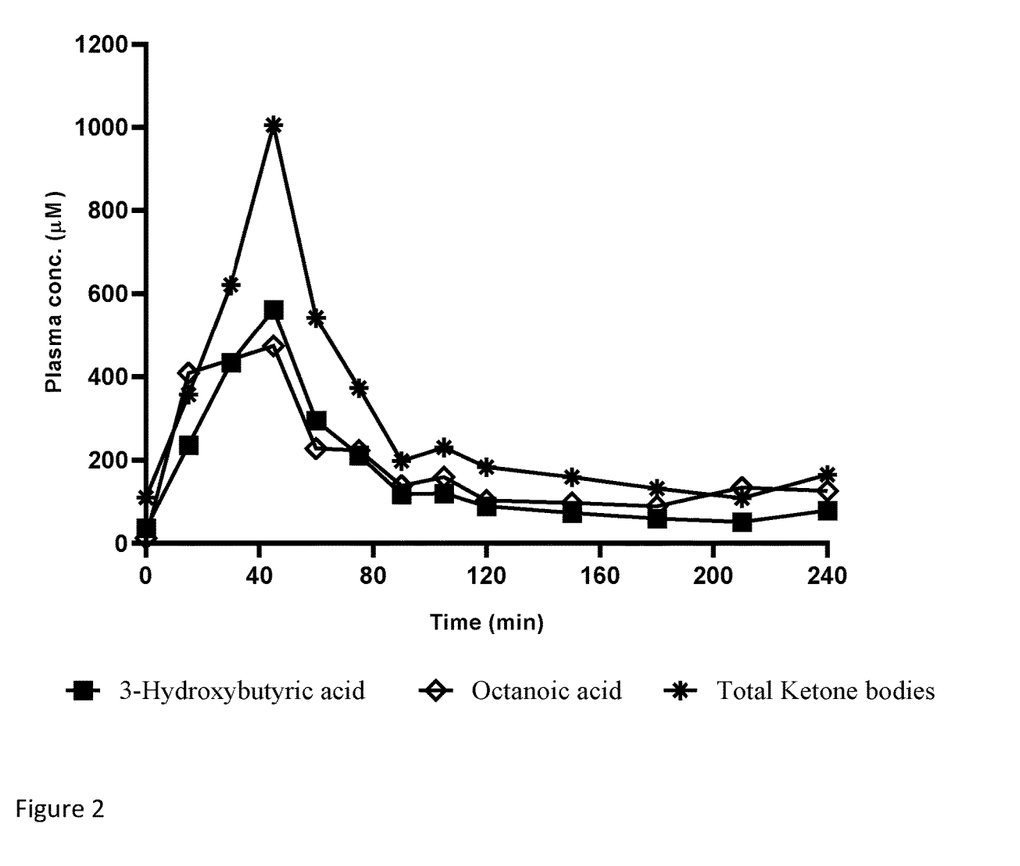
FIG. 2 shows blood plasma BHB, AcAc and total ketone levels over 4 hours after consumption of C4C8 butyrated triglycerides according to the invention "MCT C4/C8".
Figure 3:
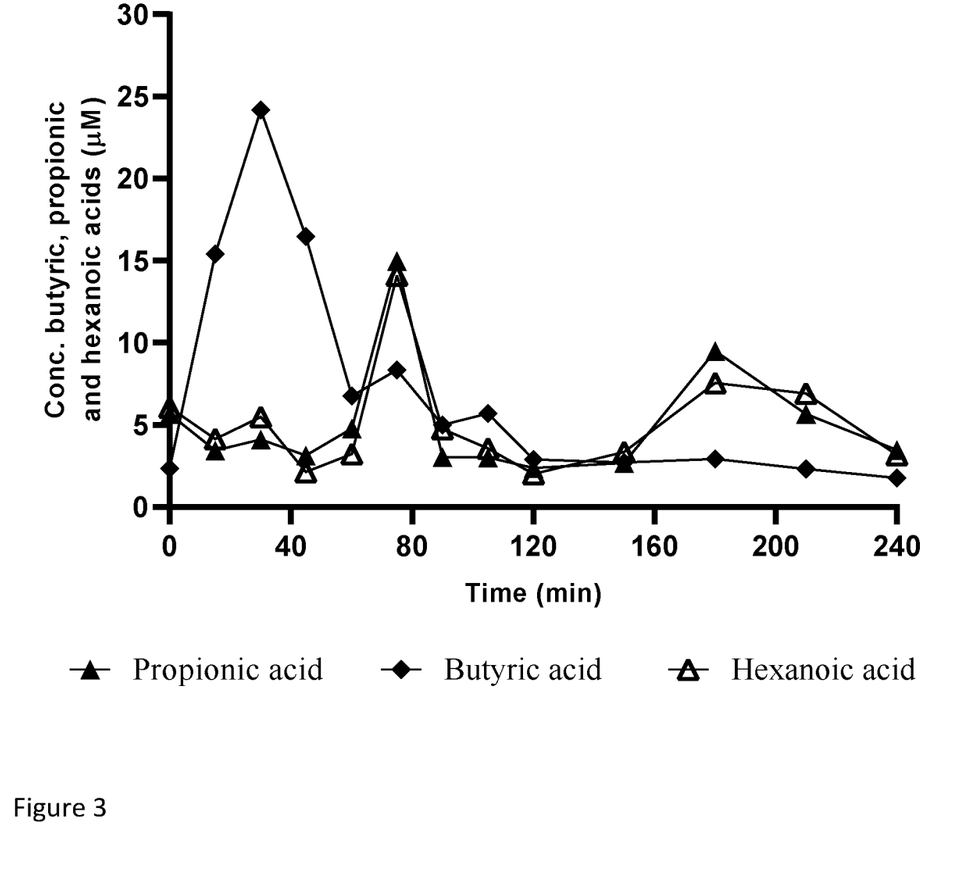
FIG. 3 shows blood plasma propionic acid, butyric acid and hexanoic acid levels over 4 hours after consumption of C4C8 butyrated triglycerides according to the invention "MCT C4/C8".

Blood plasma C3, C4, C8, BHB, AcAc and total ketone levels over the 4 hours for one individual from the C4C8 butyrated triglycerides "MCT C4/C8" treatment group are shown in FIGS. 2 and 3. Total ketone level is the sum of 3-hydroxybutyric acid and aceto-acetate measured by UPLC-MSMS.

The invention claimed is:

1. A composition comprising a compound having a formula (1), a compound having a formula (2), a compound having a formula (3) and a compound having a formula (4), wherein the compounds having the formulas (1), (2), (3) and (4) comprise at least 50% by weight of the total triglycerides in the composition, (1)

(2)

(3)

(4)

wherein n1, n2, n3, n4, n5 and n6 are independently 4 to 10.

2. The composition according to claim 1 comprising a compound having a formula (5), a compound having the formula (6), a compound having the formula (7) and a compound having the formula (8),
wherein the compounds having the formulas (5), (6), (7) and (8) comprise at least 50% by weight of the total triglycerides in the composition.

(5)

(6)

(7)

(8)

3. The composition according to claim 1, wherein the composition does not contain tributyrin.

4. A method for use in increasing blood ketone levels, and/or treating a disease treatable by increasing blood ketone levels, comprising administering to an individual in need of same a composition comprising a compound having a formula (1), a compound having a formula (2), a compound having a formula (3) and a compound having a formula (4), wherein the compounds having the formulas (1), (2), (3) and (4) comprise at least 50% by weight of total triglycerides in the composition, wherein n1, n2, n3, n4, n5 and n6 are independently 4 to 10.

5. A medicament comprising a compound having a formula (1), a compound having the formula (2), a compound having the formula (3) and a compound having the formula (4), wherein the compounds having the formulas (1), (2), (3) and (4) comprise at least 50% by weight of the total triglycerides in the medicament, wherein n1=6, n2=6, n3=6, n4=6, n5=6, and n6=6.

6. The method according to claim 4, wherein the composition does not contain tributyrin.

7. The method according to claim 4, wherein the method comprises administering to an individual in need of same a composition comprising a compound having a formula (5), a compound having the formula (6), a compound having the formula (7) and a compound having the formula (8), wherein the compounds having the formulas (5), (6), (7) and (8) comprise at least 50% by weight of the total triglycerides in the composition.

(7)

(8)

8. The medicament according to claim 5, wherein the medicament does not contain tributyrin.

9. The medicament according to claim 5 comprising a compound having a formula (5), a compound having the formula (6), a compound having the formula (7) and a compound having the formula (8),
wherein the compounds having the formulas (5), (6), (7) and (8) comprise at least 50% by weight of the total triglycerides in the medicament.

(5)

(6)

(7)

(8)

10. The composition according to claim 1, wherein the composition has does not contain tributyrin.

11. The method according to claim 4, wherein the composition is administered enterally.

12. The method according to claim 4, wherein the composition is administered orally.

13. The composition according to claim 1, wherein the compound having formula (1) comprises 2 to 35% by weight of the total triglycerides of the composition.

14. The method according to claim 4, wherein the compound having formula (1) comprises 2 to 35% by weight of the total triglycerides of the composition.

15. The medicament according to claim 5, wherein the compound having formula (1) comprises 2 to 35% by weight of the total triglycerides of the medicament.

16. The composition according to claim 2, wherein the compound having formula (5) comprises 5 to 35% by weight of the total triglycerides of the composition.

* * * * *